United States Patent Office 3,061,528
Patented Oct. 30, 1962

3,061,528

GALLIUM PLATING AND METHODS THEREFOR

Francis D. Foley, Jr., Costa Mesa, Calif., assignor to Hughes Aircraft Company, Culver City, Calif., a corporation of Delaware No Drawing. Filed July 13, 1961, Ser. No. 123,652
9 Claims. (Cl. 204—45)

This invention relates to the electroplating of gallium onto electrically conductive substrates. More particularly the invention relates to improved processes and solutions for electroplating fine-grained lustrous deposits of gallium.

As is well known gallium is a relatively low melting point metal (M.P.:29.78° C.) capable of establishing p-type conductivity in semiconductors such as germanium and silicon. The metal is extensively used for this purpose because of its ability to readily "wet" and alloy with these semiconductors at relatively low temperatures which are not detrimental to the electrical characteristics thereof. In the past it has been the practice to form the gallium into small buttons or spheres which are then placed on a semiconductor body, and fused thereto by heating the assembly to thereby form either a rectifying or an ohmic contact thereto as is well understood in the art.

As semiconductor devices become increasingly smaller it becomes more attractive to consider techniques whereby conductivity-type-determining materials such as gallium may be mounted or bonded or in some manner secured to at least a portion of some larger component so as to facilitate the handling of the conductivity-type-determining material particularly for the purpose of bringing it into contact with the semiconductor body to permit the aforesaid fusion thereto. Thus, for example, it would be extremely convenient to plate the end of a wire with gallium and then contact this plated end to the surface of a semiconductor crystal body and heat the assembly to form either a rectifying or ohmic connection thereto. It would also be highly desirable to plate portions of the semiconductor crystal body itself with gallium for the same purposes.

The electrodeposition of gallium from solutions has been heretofore accomplished in connection with the recovery of gallium from ores containing, in addition to the gallium, metals such as aluminum or compounds thereof. Thus Brown in his patents (2,582,377 and 2,582,378) refers to the electrodeposition of metallic gallium from an alkali metal aluminate solution containing gallium. Such plating processes are entirely suitable for the separation by electrodeposition of metallic gallium from other metals. However, where it is desired to provide a useful adherent plating of gallium on some substrate, these processes have not been fully satisfactory. Thus, it has been found that the gallium deposited by these methods is nodular or "tree-like" when plated from a low temperature electrolyte, and "mercury-like" when plated from a high temperature electrolyte. By "mercury-like" it is meant that the gallium tends to "ball" up.

It is therefore an object of the present invention to provide an improved gallium electroplating solution and method.

Another object is to provide an improved gallium plating solution and method whereby fine-grained lustrous deposits of metallic gallium may be plated electrolytically.

These and other objects and advantages of the invention are accomplished by providing an alkaline solution of a gallium salt (such as gallium sulfate) from which gallium, fine-grained and lustrous, may be electrolytically deposited on electrically conductive substrates including semiconductor bodies such as of germanium or silicon. More specifically, the plating solution comprises a gallium salt, an alkali metal cyanide and a compatible alkali metal carbonate.

GALLIUM PLATING SOLUTIONS

*Example I*

| | | |
|---|---|---|
| $Ga_2(SO_4)_3$ | grams | 18 |
| KCN | do | 84 |
| $K_2CO_3$ | do | 8–15 |
| $H_2O$ | ml | 1000 |
| pH | | 12.0 |
| Temp. | | Room |

The pH of this solution is adjusted to be strongly alkaline (at least 12.0) by the addition of $NH_4OH$ to the solution. The potassium cyanide serves as a complexing agent which prevents or retards excessive precipitation of the metal from solution. It also increases the conductivity and the "throwing power" of the plating solution. By "throwing power" is meant the ability to uniformly deposit metal on areas of low current density. The function of the potassium carbonate is to render the solution sufficiently conductive for current flow therethrough at the desired current density which may be between 0.35 and 2.5 amperes per square inch depending upon the speed of plating desired.

*Example II*

| | | |
|---|---|---|
| $Ga_2(SO_4)_3$ | grams | 18 |
| NaCN | do | 84 |
| $Na_2CO_3$ | do | 8–15 |
| $H_2O$ | ml | 1000 |
| pH | | 12.0 |
| Temp. | | Room |

The plating solutions of the present invention may be made up by dissolving 6 grams of pure gallium metal in a boiling mixture of 66 ml. hydrochloric acid and 33 ml. nitric acid. After dissolution of the gallium, the solution is cooled to room temperature and 20 ml. of concentrated sulfuric acid is added. The new solution is then heated to the point where dense white fumes are evolved, indicating the removal of the nitric acid. It has been found that gallium cannot be satisfactorily plated from solutions in the presence of nitrates. After cessation of fuming, the solution is cooled to room temperature and diluted with water, after which a strong sodium hydroxide solution is added to raise the pH of the solution to above 10. At this point the alkali metal cyanide and carbonate are added and the final pH of the solution is adjusted to about 12.0 by the addition of ammonium hydroxide. The solution is then ready for electroplating which may be accomplished by immersing the substrate to be plated in the solution and connecting it to a suitable source of electric power so as to constitute the substrate the cathode in the plating process. Using the plating solution of Example I, above, and a current density of about 0.35 ampere per square inch, a gold-silver alloy element was provided with a plating of gallium about 0.0001 inch thick in about two minutes. It will be noted that in Examples I and II, above, the weight proportion of the cyanide to the gallium salt is about 4:1 and the weight proportion of the gallium salt and the cyanide to the carbonate is from about 7 to 12:1. The plated gallium was fine-grained, lustrous, and strongly adherent to the substrate.

What is claimed is:

1. The process of plating gallium comprising the steps of: electroplating gallium onto a substrate from an alkaline plating solution consisting essentially of a gallium salt, an alkali metal cyanide, and an alkali metal carbonate.

2. The process of plating gallium comprising the steps of: electroplating gallium onto a substrate from an alkaline plating solution consisting essentially of gallium sulfate, an alkali metal cyanide, and an alkali metal carbonate.

3. The process according to claim 2 wherein said alkali metal is potassium.

4. The process according to claim 2 wherein said alkali metal is sodium.

5. The process of plating gallium comprising the steps of: electroplating gallium onto a substrate from an alkaline plating solution consisting essentially of a gallium salt, an alkali metal cyanide, and an alkali metal carbonate, the weight proportion of said cyanide to said gallium salt being about 4:1, the weight proportion of said gallium salt and said cyanide to said carbonate being from about 7 to 12:1.

6. The process according to claim 5 wherein said salt is gallium sulfate, and said alkali metal is potassium.

7. The process according to claim 5 wherein said salt is gallium sulfate, and said alkali metal is sodium.

8. The process of plating gallium comprising the steps of: electroplating gallium onto a substrate from a solution consisting essentially of gallium sulfate, potassium cyanide, and potassium carbonate, the weight proportion of said cyanide to said sulfate being about 4:1, the weight proportion of said sulfate and said cyanide to said carbonate being from about 7 to 12:1, the pH of said solution being about 12.

9. The process of plating gallium comprising the steps of: preparing a gallium plating bath by dissolving gallium in a solution of hydrochloric and nitric acids, adding sulfuric acid to said solution after said gallium has been dissolved therein, heating said solution until fuming thereof ceases, then adding an alkali metal cyanide and an alkali metal carbonate to said solution, adjusting the pH of said solution to about 12, and then electroplating gallium from said solution onto a substrate.

References Cited in the file of this patent

UNITED STATES PATENTS

| | | |
|---|---|---|
| 2,582,376 | Frary | Jan. 15, 1952 |
| 2,582,377 | Brown | Jan. 15, 1952 |
| 2,582,378 | Brown | Jan. 15, 1952 |
| 2,873,232 | Zimmerman | Feb. 10, 1959 |

OTHER REFERENCES

Fogg: Trans of the Electrochemical Society, vol. 66, 1934, pages 107–115.